No. 680,307. Patented Aug. 13, 1901.
G. B. ANDERSON.
MOTOR VEHICLE.
(Application filed Oct. 29, 1900.)
(No Model.) 2 Sheets—Sheet 1.

Witnesses

Inventor
George B. Anderson.
By Ennis & Co.
Attorneys

No. 680,307. Patented Aug. 13, 1901.
G. B. ANDERSON.
MOTOR VEHICLE.
(Application filed Oct. 29, 1900.)

(No Model.) 2 Sheets—Sheet 2.

Witnesses
Inventor
George B. Anderson.
By Ennis & Co.
Attorneys

UNITED STATES PATENT OFFICE.

GEORGE B. ANDERSON, OF WASHINGTON, DISTRICT OF COLUMBIA.

MOTOR-VEHICLE.

SPECIFICATION forming part of Letters Patent No. 680,307, dated August 13, 1901.

Application filed October 29, 1900. Serial No. 34,774. (No model.)

*To all whom it may concern:*

Be it known that I, GEORGE B. ANDERSON, a citizen of the United States, residing at Washington, in the District of Columbia, have invented certain new and useful Improvements in Motor-Vehicles; and I do declare the following to be a full, clear, and exact description of the invention, such as will enable others skilled in the art to which it appertains to make and use the same.

My invention relates to improvements in motor-vehicles or automobiles; and the main object of my invention is the provision of an automobile which can be readily started, stopped, and reversed without in any way injuring the parts of the machine and also a reliable steering apparatus for said automobile.

Another object of my invention is the provision of a simple, durable, and comparatively cheap motor-vehicle or automobile whose parts are so combined as to make a very useful and practical machine.

To attain the desired objects, my invention consists of a motor-vehicle or automobile embodying novel features of construction and combination of parts, substantially as disclosed herein.

Figure 1:
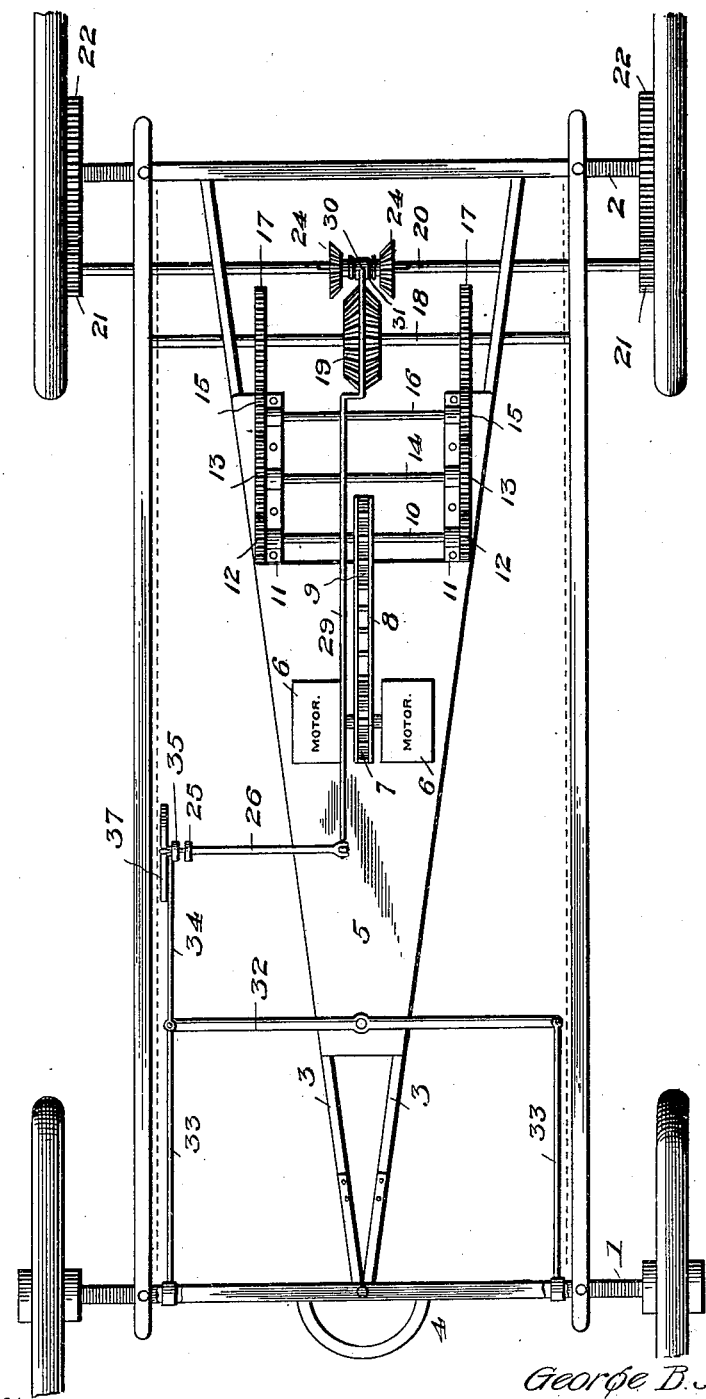
Figure 2:
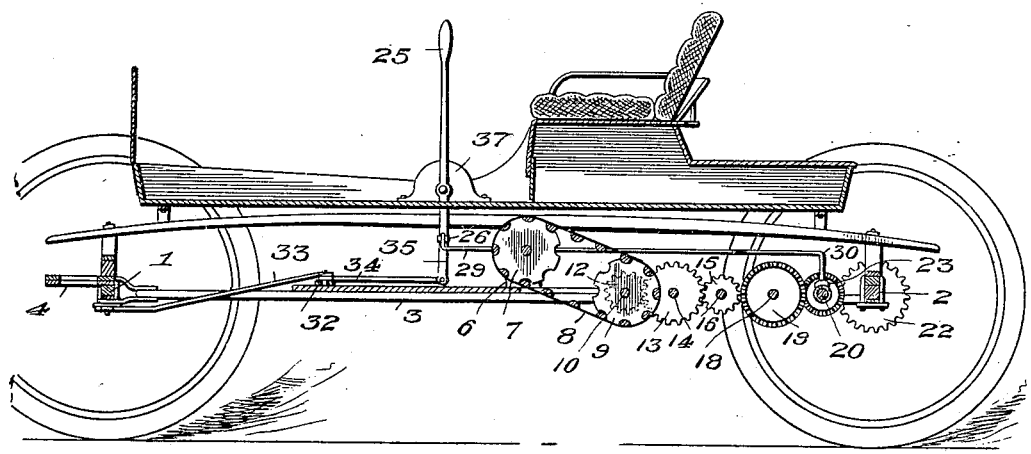
Figure 3:
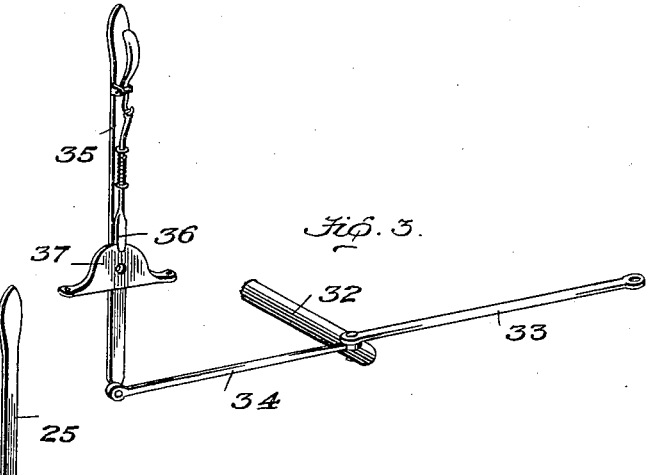
Figure 4:
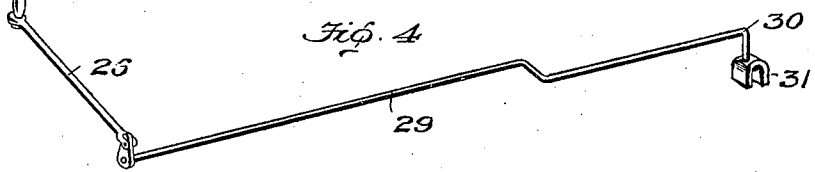

In the drawings, Figure 1 is a top plan view of the running-gear of my automobile with the motive power and steering-gear in their proper positions. Fig. 2 is a longitudinal central sectional view of the entire automobile. Fig. 3 is a perspective view of a portion of the steering apparatus, and Fig. 4 is a similar view of the lever and connections for starting or reversing the movement of the automobile.

Referring by numerals to the drawings, the numeral 1 designates front axle, and 2 the rear axle, of my automobile, and connected to these axles are the reaches 3, whose forward ends meet at the fifth-wheel 4. Mounted on these reaches is a triangular platform 5, upon which is mounted my motive power, which consists of the motors 6, whose axles carry the sprocket-wheel 7, which meshes with the slatted sprocket-chain 8, which meshes with the sprocket-wheel 9, mounted upon the shaft 10, which is mounted in the bearings 11, and carries the gears 12, which mesh with the large gears 13 upon the shaft 14, said gears meshing in turn with the gears 15, mounted upon the shaft 16. These gears 15 mesh with the large gears 17, mounted upon the shaft 18, which has rigidly secured to the center thereof the duplex gear 19. To the rear of the shaft 18 is mounted the long shaft 20, upon whose outer ends is mounted the gears 21, which mesh with the large gears 22, mounted rigidly upon the hubs of the rear wheels.

Mounted on and slidable upon the shaft 20 is a clutch 23, provided with the oppositely-arranged gears 24, which are adapted to be thrown alternately in operative connection with the duplex gear 19 to give the automobile a forward or reverse propulsion, as may be desired. In Fig. 4 I have shown the mechanism for operating this clutch, and it consists of the hand-lever 25, fulcrumed above the floor of the automobile and having its lower end connected movably to the arm 26, which has the forked end 27 connected pivotally to a plate 28 at right angles to the arm 26, and is connected to the long arm or rod 29, which has a right-angled portion or bend 30, terminating in the clutch-operating jaw or fork 31 to engage the clutch-sleeve. It will be seen that when the hand-lever is pushed forward one of the clutch-gears is operated, so that it engages one side of the duplex gear, and if the lever is pulled backward the other gear of the clutch will engage the other side of the duplex gear, thus giving the automobile a reverse propulsion.

In Fig. 3 I have illustrated my steering-gear-operating mechanism, and in connection with Fig. 1 the entire mechanism can be seen and understood both as to construction and operation. Pivoted upon the forward end of the triangular platform is a rod or bar 32, to whose outer ends are pivotally secured the rods 33, whose forward ends are pivotally secured to the under side of the front axle of the automobile. Connected to the bar 32 upon the same side of the automobile as the lever 25 is a short rod or arm 34, whose rear end is pivotally connected to the lower end of the hand-lever 35, which is fulcrumed upon the same shaft as lever 25, and is further provided with a spring-actuated dog 36, which is adapted to engage the single notch of the segment 37, secured to the floor of the vehicle.

From this description, taken in connection with the drawings, the operation of my automobile is readily understood; but, briefly stated, it is as follows: To start the automobile, the motors are set in motion. The hand-lever 25 is then pushed forward, which connects the clutch to one side of the duplex gearing, which imparts motion to the rear wheels of the automobile. To reverse the motion of the automobile, it is simply necessary to pull the lever backward, which changes the connections from one side of the duplex gearing to the other and engages the other gear of the clutch, thus causing its shaft to have an opposite motion, and consequently the rear wheels of the automobile. In operating the steering device push the lever 35 forward and the automobile will turn to the left, and pull it backward and it will turn to the right, while allowing its dog to remain in the notch of the segment the front wheels will be in line with the rear wheels.

It is evident that I provide an automobile which is easily and quickly operated to start, stop, or reverse, as well as to steering, thus producing a combination of parts which is very useful and practical.

What I claim, and desire to protect by Letters Patent, is—

In a motor-vehicle, the combination with the running-gear, a motor mounted thereon, a sprocket-wheel mounted on the axle of the motor, means connecting said sprocket-wheel with a sprocket-wheel mounted on a shaft in rear of the motor, gears mounted on the ends of said shaft, intermediate gears of different sizes adapted to operate gears on a shaft 18, duplex gears mounted on the shaft 18, a shaft 20 in rear of shaft 18 having gears mounted thereon adapted to mesh with gears on the hubs of the rear wheels, together with gears 24 and the clutch mechanism and means for throwing the gears 24 and 19 into engagement for giving a forward or backward movement to the vehicle, substantially as described.

In testimony whereof I have hereunto set my hand in presence of two subscribing witnesses.

GEORGE B. ANDERSON.

Witnesses:
H. J. ENNIS,
CHAS. E. RIORDON.